United States Patent Office 3,546,101
Patented Dec. 8, 1970

3,546,101
CRACKING CATALYST
Christopher John Leonard Metcalfe, Sunbury, and Kenneth Hugh Bourne, Knaphill, England, assignors to The British Petroleum Company Limited, London, England, a corporation of England
No Drawing. Filed Mar. 29, 1968, Ser. No. 717,450
Claims priority, application Great Britain, Apr. 11, 1967, 16,437/67
Int. Cl. C10g 11/02
U.S. Cl. 208—120     20 Claims

ABSTRACT OF THE DISCLOSURE

A low coking cracking catalyst consists of a Group IV metal oxide gel containing up to 3% Group III metal ions, none of which are on the surface of the gel. Usually a silica gel containing aluminum is used. The catalyst is prepared by precipitating a co-gel of the two elements and acid washing to remove surplus aluminum.

---

The present invention relates to a novel alumina-in-silica catalyst, a process for the production of the catalyst and a process for cracking hydrocarbons using the catalyst.

It is though that ordinary silica-aluminas, which are well-known as cracking catalysts, contain comparatively large clumps of what is essentially alumina distributed on the surface and through the body of the silica gel, which forms the bulk of the catalyst. It is believed that catalytic activity is associated with these aluminum atoms in certain environments. It is also thought that there are two distinct types of active centre which are known as Lewis and Bronsted sites after the type of acidity that is supposed to give them their activity. One of the chief drawbacks of such catalysts is that when they are used to crack hydrocarbons coke builds up in large quantities and must be burnt off periodically.

Lewis and Bronsted acidities are defined and discussed in Chapter 4 of Gould—"Mechanism & Structure in Organic Chemistry"—Rinehart 1959.

It has been suggested that the formation of coke probably takes place where there are clusters of aluminum atoms not separated by silicon atoms, which form what are virtually small pockets of alumina inside the silica-alumina catalyst. We think that to avoid coking it is desirable to have present only discrete Lewis and Bronsted sites.

We have now discovered, in Group III metal treated Group IV metal oxides, catalysts which give very little coke in hydrocarbon cracking reactions.

According to one aspect of the present invention there is provided a catalyst which comprises Group IV metal oxide gel containing some, but less than 3.0% by weight, Group III metal atoms, substantially none of which are present at the surface of the Group IV gel.

Preferably the catalyst contains between 0.01% and 0.5% by weight of Group III metal.

According to another aspect of the present invention there is provided a process for the production of a catalyst which comprises hydrolysing a hydrolysable Group IV metal compound with a small proportion of hydrolysable Group III metal compound to form a Group IV metal oxide/Group III metal oxide co-gel and leaching the co-gel until less than 3% of Group III metal by weight remains and no more Group II metal ions can be washed off.

Preferably the hydrolysable Group III metal compound is an aluminium compound.

The hydrolysable aluminium compound may be an aluminium alkoxide such as aluminium iso-proproxide.

Preferably the Group IV oxide/Group III metal oxide co-gel contains not more than 2% of Group III metal before it is leached.

The gel may preferably be washed with a dilute aqueous mineral acid. Complexing agents may also be used. β-diketones, particularly acetyl acetone are most suitable.

According to a further feature of this invention there is provided a process for the cracking of hydrocarbons, which process comprises cracking a hydrocarbon or hydrocarbons in the presence of a catalyst as described above, at elevated temperature.

The temperature may suitably be between 150° C. and 700° C., preferably between 250° C. and 500° C.

Pressure may be atmospheric, sub-atmospheric or super-atmospheric.

The liquid hourly space velocity of the feed is preferably between 0.1 and 5.0.

The feedstock may be introduced in a carrier gas such as nitrogen or steam.

A suitable feed is a gas-oil fraction derived from crude oil, but any hydrocarbon or mixtures of hydrocarbons having more than 3 carbon atoms may be used.

This invention is illustrated but not limited by the following examples:

Runs 4, 5, 6, 7, do not show the process of the present invention and are provided for comparison only.

All the runs were carried out at atmospheric pressure using a tertiary butyl benzene feed in 1000 v./v./hr. nitrogen at a liquid hourly space velocity of 1.0. The catalyst volume was 2 ml. The results are set out in the following table:

A comparison of Runs 1, 2 and 3 with runs 4, 5 and 6 shows that to obtain the same conversion with the aluminium-in-silica catalyst as with the conventional silica-alumina a rather higher temperature is needed. However the amount of coke deposited is reduced by at least a factor of 10 and the amount of alumina required by a factor of more than 100. Examples 7 and 8 show how this effect is maintained over a longer period.

COMPARISON OF Al-IN-SILICA WITH SILICA-ALUMINA

| Catalyst | Temp., °C. | Conversion percent mol | | | Recovery (based on feed), total percent wt. | Carbon on catalyst percent wt. | Time on stream, hrs. |
|---|---|---|---|---|---|---|---|
| Run No.: | | | | | | | |
| 1 ⎫ | 350 | [1] 63.4 | | | 92.3 | 0.1 | 2 |
| 2 ⎬ 0.1% wt. Al-in-silica (GP-9) | 450 | [1] 98.4 | | | 91.4 | 0.1 | 2 |
| 3 ⎭ | 250 | [1] 7.1 | | | 99.3 | 0.1 | 2 |
| 4 ⎫ | 250 | [1] 28.3 | | | 95.0 | 1.00 | 2 |
| 5 ⎬ Silica-alumina (12.5% wt. alumina) | 300 | [1] 62.9 | | | 94.0 | 1.16 | 2 |
| 6 ⎭ | 375 | [1] 99.3 | | | 95.2 | 1.8 | 2 |
| | | 0–2 hrs. | 2–4 hrs. | 4–6 hrs. | | | |
| 7 Silica-alumina | 300 | 66.8 | 66.2 | 62.1 | 94.6 | 1.8 | 6 |
| 8 Al-in-silica 0.1% wt. Al | 350 | 69.3 | 61.4 | 58.4 | 93.0 | 0.22 | 6 |

[1] Activities remained sensibly steady over a two-hour test period. All catalysts were activated for 16 hours at 550° C. in 1,000 GHSV nitrogen.

What we claim is:

1. A low coking cracking catalyst made in accordance with the process of claim 5 and comprising Group IV metal oxide gel containing at least 0.01% but less than 3.0% by weight of Group III metal atoms dispersed within said gel, substantially none of said Group III metal atoms being present at the surface of said Group IV metal gel.

2. A catalyst according to claim 1 which contains between 0.01% and 0.5% of Group III metal.

3. A catalyst according to claim 1 where the Group IV metal is silicon.

4. A catalyst according to claim 1 where the Group III metal is aluminum.

5. A process for the preparation of a low coking cracking catalyst which comprises hydrolyzing a hydrolyzable Group IV metal compound with a small amount of hydrolyzable Group III metal compound to form a Group IV metal oxide/Group III metal oxide co-gel in which the Group III metal oxide is dispersed within said co-gel and thereafter contacting said co-gel with a leaching agent until at least 0.01% but less than 3.0% of Group III metal by weight remains dispersed within said co-gel, and substantially none of said Group III metal atoms being present at the surface of said gel.

6. A process according to claim 5 where the Group III metal compound is an aluminum compound.

7. A process according to claim 6 where the hydrolysable aluminum compound is an aluminum alkoxide.

8. A process according to claim 7 where the aluminum alkoxide is aluminum iso-propoxide.

9. A process according to claim 5 where the Group IV metal oxide is silica gel.

10. A process according to claim 5 where the Group IV oxide/Group III metal oxide co-gel contains not more than 2.0% of Group III metal before it is leached.

11. A process according to claim 5 where the gel is washed with a dilute aqueous mineral acid or a complexing agent.

12. A process according to claim 11 where the gel is washed with a beta-diketone.

13. A process according to claim 12 where the gel is washed with acetyl acetone.

14. A process for the cracking of hydrocarbons which comprises contacting a hydrocarbon feedstock in a treating zone with the low coking catalyst of claim 1, at a temperature between 150° and 700° C., and at an elevated pressure to effect the cracking thereof, and thereafter recovering the cracked hydrocarbon products.

15. A process according to claim 14 when performed at a temperature between 250° and 500° C.

16. A process according to claim 14 when the liquid hourly space velocity is between 0.1 and 5.0.

17. A process according to claim 14 where the feedstock is introduced in a carrier gas.

18. A process according to claim 17 where the carrier gas is nitrogen or steam.

19. A process according to claim 14 where the feed is a hydrocarbon or mixture of hydrocarbons having more than 3 carbon atoms per molecule.

20. A process according to claim 19 where the feed is a gas-oil fraction derived from crude oil.

References Cited

UNITED STATES PATENTS

| | | | |
|---|---|---|---|
| 2,651,617 | 9/1953 | Schmerling | 252—450 |
| 2,348,647 | 5/1944 | Reeves et al. | 208—120 |
| 2,834,719 | 5/1958 | Mosely et al. | 208—120 |
| 2,928,785 | 3/1960 | Hirchler | 208—120 |

DELBERT E. GANTZ, Primary Examiner

A. RIMENS, Assistant Examiner

U.S. Cl. X.R.

252—450, 455

PO-1050
(5/69)

UNITED STATES PATENT OFFICE
CERTIFICATE OF CORRECTION

Patent No. 3,546,101   Dated December 8, 1970

Inventor(s) Christopher John Leonard Metcalfe, and Kenneth Hugh B(

It is certified that error appears in the above-identified patent and that said Letters Patent are hereby corrected as shown below:

Column 2, line 10 for "Group II" read --Group III--.

Signed and sealed this 27th day of April 1971.

(SEAL)
Attest:

EDWARD M.FLETCHER,JR.            WILLIAM E. SCHUYLER, JR
Attesting Officer                Commissioner of Patents